Sept. 9, 1969         D. P. FEDER         3,466,117

FOUR COMPONENT OBJECTIVE LENS

Filed May 29, 1967         2 Sheets-Sheet 1

DONALD P. FEDER
INVENTOR.

BY *William F. Delaney Jr.*
*Robert W. Hampton*
ATTORNEYS

United States Patent Office 3,466,117
Patented Sept. 9, 1969

3,466,117
FOUR COMPONENT OBJECTIVE LENS
Donald P. Feder, Rochester, N.Y., assignor to Eastman Kodak Company, Rochester, N.Y., a corporation of New Jersey
Filed May 29, 1967, Ser. No. 641,834
Int. Cl. G02b 9/34
U.S. Cl. 350—220                                  1 Claim

ABSTRACT OF THE DISCLOSURE

Objective lenses comprising four components, the two outer components being simple negative meniscus elements concave toward the centrally located diaphragm, the front inner component being a positive cemented doublet and the rear inner component being a positive cemented triplet.

---

Figure 1:
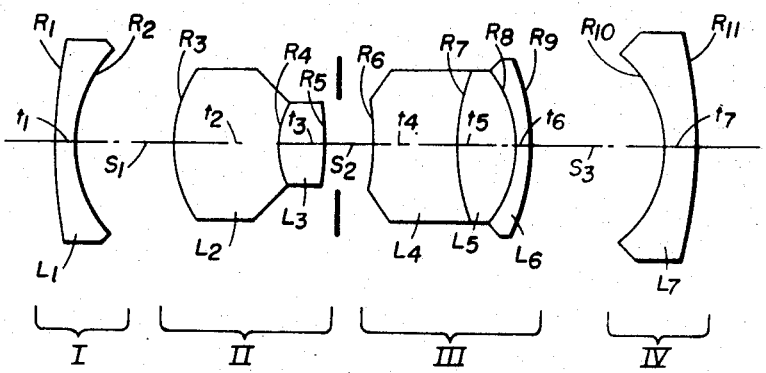

This invention relates to seven element, four component lenses, which are well corrected for all aberrations and have high resolution qualities, such as is required for use in microfilm printing. More particularly, this invention relates to lenses comprising four airspaced components, the outer two components being simple negative meniscus elements highly concave toward the centrally located diaphragm, and the two inner components comprising a positive cemented doublet on the front side of the diaphragm and a positive cemented triplet on the rear side of the diaphragm.

Objective lenses used for micro-imaging must be exceptionally well corrected for all aberrations, and must be capable of extremely high resolution. These high quality requirements for micro-imaging lenses are due to the fact that slight defects, which may be tolerable or even unnoticeable in ordinary objectives, can seriously affect micro-image quality and may even cause the image to fuse. These quality requirements are particularly difficult to attain at wide field angles.

It is an object of this invention to provide four component objective lenses which are exceptionally well corrected for spherical aberration, chromatic aberration, coma, astigmatism, field-curvature and distortion.

It is another object of this invention to provide improved four component objective lenses having sufficiently high resolution qualities for use in micro-imaging.

Another object of this invention is to provide improved micro-imaging objective lenses adapted to minify the image by a factor ranging approximately from 35:1 to 12:1 with a field coverage of approximately 55°.

Further objects and advantages will be found in the details of construction disclosed in the accompanying example and drawings.

These objects are accomplished according to the present invention by seven element, four component lenses as described above in which the outer two components are simple negative meniscus elements and in which the rear compound positive component comprises three cemented elements, the middle element of which has a higher index of refraction than the outer elements. The use of these simple diverging outer elements permits the lens to cover a field angle of approximately 55°, while the inner two converging components compensate for all the various aberrations.

In the drawings:

FIG. 1 is a sectional view of an objective lens embodying the invention with the long conjugate of the left.

Figure 2:
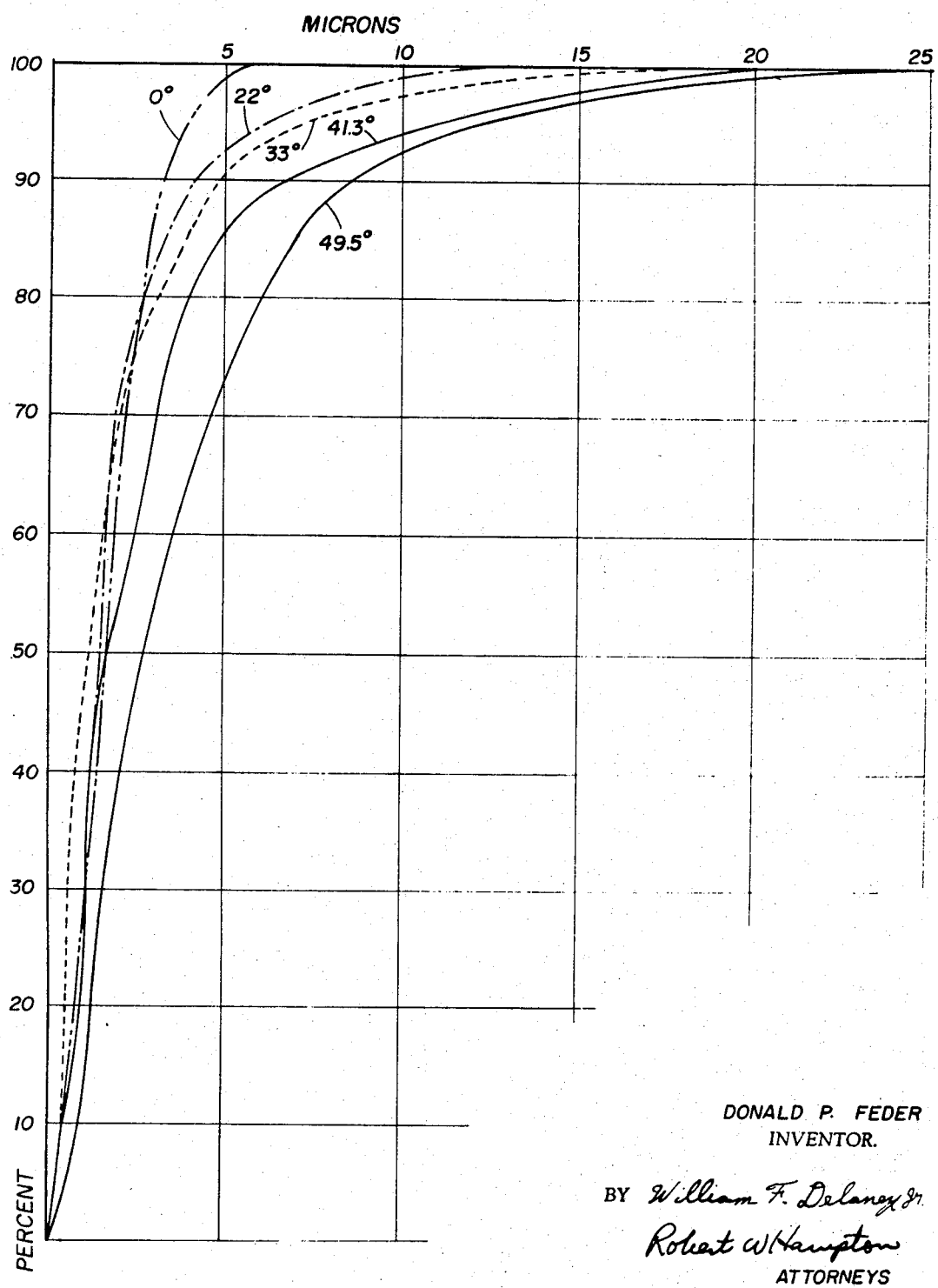

FIG. 2 comprises a set of curves showing the energy distribution of light rays at field angles of (a) 0°, (b) 22°, (c) 33°, (d) 41.3°, and (e) 49.5°, all at an aperture of f/6.5 and a magnification factor of 35.

Figure 3A:
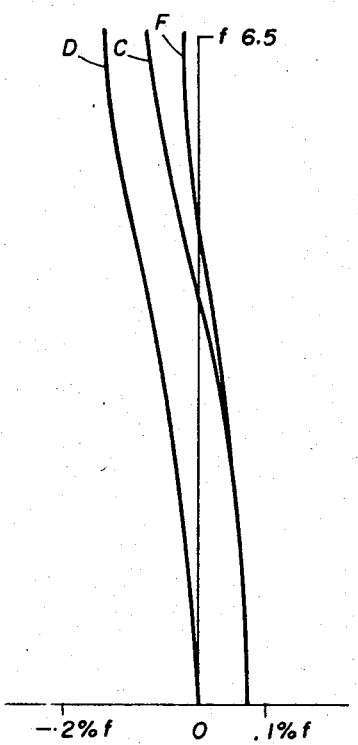
Figure 3B:
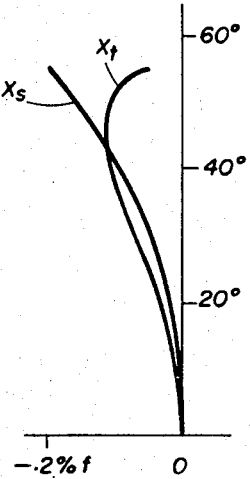
Figure 3C:
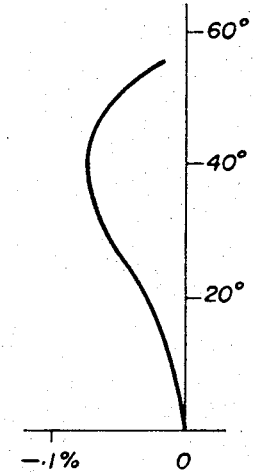

FIG. 3 comprises a set of correction curves for the lens disclosed in Example 1 below showing (a) the spherical aberration curves for the C, D and F lines of the spectrum, (b) the curves for sagittal and tangential astigmatism, and (c) the curve for distortion.

The lens in FIG. 1 comprises four components, namely an outer pair of diverging components I and IV encompassing an inner pair of converging components II and III. Components I and IV are both simple negative meniscus elements concave toward the centrally located diaphragm. Component II is a cemented doublet, comprising a front meniscus element and a rear biconvex element. Component III is a cemented triplet comprising, from front to rear, a biconcave negative element, a biconvex positive element and a meniscus element. The middle element of Component III has a higher index of refraction than the outer two elements of that component, so the two buried surfaces of that component are both converging.

Numerical data for constructing a typical objective lens according to this invention as outlined above is given in the following example, in which the lens elements are numbered from front to rear, N is the index of refraction of each lens element for the D line, V is the index of dispersion, and R, T and S refer respectively to the radii of curvature of the lens surfaces, the thicknesses of the lens elements and the airspaces between the elements, numbered by subscript from front to rear:

EXAMPLE
[f=100; 55° field angle]

| Lens: | $N_d$ | V | Radii | Thicknesses and spacings |
|---|---|---|---|---|
| $L_1$ | 1.498 | 67.0 | $R_1=232.61$ | $T_1=7.89$ |
|  |  |  | $R_2=47.19$ | $S_1=36.40$ |
| $L_2$ | 1.784 | 26.1 | $R_3=52.37$ | $T_2=39.23$ |
|  |  |  | $R_4=26.32$ |  |
| $L_3$ | 1.498 | 67.0 |  | $T_3=17.35$ |
|  |  |  | $R_5=-84.80$ |  |
| Diaphragm |  |  |  | $S_2=14.31$ |
|  |  |  | $R_6=-102.53$ |  |
| $L_4$ | 1.498 | 67.0 |  | $T_4=31.07$ |
|  |  |  | $R_7=71.16$ |  |
| $L_5$ | 1.753 | 50.6 |  | $T_5=21.16$ |
|  |  |  | $R_8=-45.53$ |  |
| $L_6$ | 1.720 | 29.3 |  | $T_6=6.70$ |
|  |  |  | $R_9=-86.18$ |  |
|  |  |  |  | $S_3=49.39$ |
| $L_7$ | 1.498 | 67.0 | $R_{10}=-44.90$ | $T_7=12.07$ |
|  |  |  | $R_{11}=-205.38$ |  |

The curves shown in FIG. 2 are a particularly pertinent criterion of lens performance because they represent the result of tracing hundreds of rays through the lens from point sources at different field angles. The rays traced represent the three primary colors. The quality of the lens is measured by plotting the percentage of light rays from each point source, which are imaged in a spot on the image plane versus the size of the spot. The curves for different field angles give an accurate description of lens quality, since ray tracing is the most accurate method of analyzing a lens without actually constructing a test sample. In addition, the resolution quality of the lens is readily apparent.

As shown by the curves in FIG. 2, the above lens gives exceptionally high resolution. For example, it will be seen that approximately 93 percent of all the light rays within a field angle of 49.5° are imaged by the lens within a spot having a diameter of 10 microns.

As shown by the curves in FIG. 3, the above lens is corrected to such a degree that spherical aberration is less than half of the Rayleigh-limit, the sagittal and tangential fields are within approximately 0.2% of the focal length and distortion is less than 0.1%.

Although the invention has been described in considerable detail with reference to a certain preferred embodiment thereof, it will be understood that variations and modifications can be effected without departing from the spirit and scope of the invention as described hereinabove.

I claim:

1. An objective lens comprising four spaced, optically aligned components, the front and rear components being simple negative meniscus elements concave toward the centrally located diaphragm, the two inner components being compound positive components encompassing the diaphragm space, the front compound positive component being a cemented doublet, the rear compound positive component being a cemented triplet, the lens elements having substantially the following characteristics and spatial relations at an equivalent focal length of 100, in which the lens elements are numbered from the front, N is the index of refraction for the D line, V is the index of dispersion, and R, T and S refer respectively to the radii of curvature of the lens surfaces, the axial thicknesses of the lens elements and the axial spacings between the lens elements, numbered by subscript from front to rear:

| | $N_d$ | V | Radii | Thicknesses and spacings |
|---|---|---|---|---|
| Lens: | | | | |
| $L_1$ | 1.498 | 67.0 | $R_1=232.61$ | $T_1=7.89$ |
| | | | $R_2=47.19$ | $S_1=36.40$ |
| $L_2$ | 1.784 | 26.1 | $R_3=52.37$ | $T_2=39.23$ |
| | | | $R_4=26.32$ | |
| $L_3$ | 1.498 | 67.0 | | $T_3=17.35$ |
| Diaphragm | | | $R_5=-84.80$ | $S_2=14.31$ |
| | | | $R_6=-102.53$ | |
| $L_4$ | 1.498 | 67.0 | $R_7=71.16$ | $T_4=31.07$ |
| $L_5$ | 1.753 | 50.6 | $R_8=-45.53$ | $T_5=21.16$ |
| $L_6$ | 1.720 | 29.3 | | $T_6=6.70$ |
| | | | $R_9=-86.18$ | $S_3=49.39$ |
| | | | $R_{10}=-44.90$ | |
| $L_7$ | 1.498 | 67.0 | $R_{11}=-205.38$ | $T_7=12.07$ |

References Cited

UNITED STATES PATENTS 2,781,695  2/1957  Klemt _____ 350—220

FOREIGN PATENTS 1,196,393  7/1965  Germany.

DAVID SCHONBERG, Primary Examiner

PAUL A. SACHER, Assistant Examiner